US011909152B2

(12) United States Patent
Jiang et al.

(10) Patent No.: US 11,909,152 B2
(45) Date of Patent: Feb. 20, 2024

(54) ELECTRICAL DEVICE WITH TERMINAL REGION AND METHOD FOR PRODUCING A TERMINAL REGION

(71) Applicant: TDK Electronics AG, Munich (DE)

(72) Inventors: Yun Jiang, Neubiberg (DE); Karsten Frey, Giengen an der Brenz (DE)

(73) Assignee: TDK Electronics AG, Munich (DE)

( * ) Notice: Subject to any disclaimer, the term of this patent is extended or adjusted under 35 U.S.C. 154(b) by 0 days.

(21) Appl. No.: 16/648,559

(22) PCT Filed: Sep. 20, 2018

(86) PCT No.: PCT/EP2018/075485
§ 371 (c)(1),
(2) Date: Mar. 18, 2020

(87) PCT Pub. No.: WO2019/057828
PCT Pub. Date: Mar. 28, 2019

(65) Prior Publication Data
US 2020/0220277 A1 Jul. 9, 2020

(30) Foreign Application Priority Data
Sep. 21, 2017 (DE) ......................... 102017121924.2

(51) Int. Cl.

| | |
|---|---|
| ***H01R 4/20*** | (2006.01) |
| ***H01R 4/18*** | (2006.01) |
| ***H01F 27/02*** | (2006.01) |
| ***H01F 27/28*** | (2006.01) |
| ***H01F 27/29*** | (2006.01) |
| ***H01F 41/10*** | (2006.01) |

(Continued)

(52) U.S. Cl.
CPC ............. *H01R 4/187* (2013.01); *H01F 27/02* (2013.01); *H01F 27/2828* (2013.01); *H01F 27/292* (2013.01); *H01F 41/10* (2013.01); *H01R 43/0228* (2013.01); *H01R 43/048* (2013.01); *H01F 2027/297* (2013.01)

(58) Field of Classification Search
CPC .................................... H01R 4/20; H01F 5/06
See application file for complete search history.

(56) References Cited

U.S. PATENT DOCUMENTS 2,877,441 A * 3/1959 Narozny ............. H01R 13/052 439/82
3,609,616 A 9/1971 Dumeige et al.
(Continued)

FOREIGN PATENT DOCUMENTS

CA 2098006 A1 7/1992
CN 101490903 A 7/2009
(Continued)

OTHER PUBLICATIONS

International Search Report and Written Opinion in European Patent Application No. PCT/EP2018/075485 dated Mar. 28, 2019 (9 pages).

*Primary Examiner* — Chau N Nguyen
(74) *Attorney, Agent, or Firm* — Nixon Peabody LLP

(57) ABSTRACT

An electrical device having a terminal region for connection with a printed circuit board. The terminal region has a stranded wire and an enclosure piece surrounding the stranded wire. The enclosure piece is connected with the stranded wire, for example, by thermal diffusion bonding.

13 Claims, 5 Drawing Sheets

(51) Int. Cl.
*H01R 43/02* (2006.01)
*H01R 43/048* (2006.01)

(56) References Cited

U.S. PATENT DOCUMENTS

| | | | | |
|---|---|---|---|---|
| 3,808,588 | A * | 4/1974 | McGregor | H01R 12/58 439/876 |
| 3,963,857 | A | 6/1976 | Reynolds | |
| 3,995,931 | A * | 12/1976 | Pienkowski | H01R 12/58 439/866 |
| 5,012,125 | A * | 4/1991 | Conway | H01F 27/34 307/149 |
| 5,316,506 | A * | 5/1994 | Ito | H01R 4/188 174/94 R |
| 5,414,926 | A * | 5/1995 | Ito | H01R 43/048 29/753 |
| 5,612,508 | A * | 3/1997 | Kasper | H01R 4/187 174/15.6 |
| 5,772,454 | A * | 6/1998 | Long, Jr. | H01R 4/028 439/83 |
| 6,125,533 | A * | 10/2000 | Warner | B23K 11/002 29/868 |
| 6,442,832 | B1 * | 9/2002 | Noble | H01R 12/53 29/761 |
| 6,849,805 | B2 * | 2/2005 | Honda | H05K 3/3452 174/250 |
| 7,462,081 | B2 * | 12/2008 | Kato | H01R 4/183 174/84 C |
| 8,196,299 | B2 * | 6/2012 | Lee | H01R 43/0484 29/867 |
| 8,635,770 | B2 * | 1/2014 | Warner | H02G 1/14 29/858 |
| 9,318,814 | B2 * | 4/2016 | Tomita | H01R 4/186 |
| 9,672,972 | B2 * | 6/2017 | Takiguchi | H01F 27/324 |
| 2002/0175798 | A1 * | 11/2002 | Sigl | H01F 27/325 336/198 |
| 2005/0046534 | A1 | 3/2005 | Gilmartin et al. | |
| 2005/0233638 | A1 | 10/2005 | Taylor | |
| 2007/0080592 | A1 | 4/2007 | Ohta | |
| 2009/0218134 | A1 * | 9/2009 | Stroh | H01R 43/0214 174/74 R |
| 2009/0315419 | A1 | 12/2009 | Mita | |
| 2010/0096185 | A1 * | 4/2010 | Otsuka | H01R 4/021 174/94 R |
| 2013/0005197 | A1 | 1/2013 | Sato | |
| 2013/0199841 | A1 | 8/2013 | Lehmann | |
| 2013/0213710 | A1 | 8/2013 | Ohnuma et al. | |
| 2015/0061811 | A1 | 3/2015 | Takagi | |
| 2016/0006134 | A1 | 1/2016 | Ohnuma | |
| 2016/0028167 | A1 | 1/2016 | Hanazaki | |
| 2016/0099510 | A1 * | 4/2016 | Trafton | H01B 7/0036 174/74 R |
| 2016/0276998 | A1 | 9/2016 | Hsieh | |
| 2017/0069975 | A1 | 3/2017 | Baldauf | |
| 2017/0179663 | A1 | 6/2017 | Miyakawa | |
| 2017/0214156 | A1 | 7/2017 | Washio | |
| 2018/0053582 | A1 * | 2/2018 | Koeppendoerfer | H01B 7/30 |
| 2019/0341164 | A1 | 11/2019 | Sakamoto et al. | |

FOREIGN PATENT DOCUMENTS

| | | | |
|---|---|---|---|
| CN | 101607343 | A | 12/2009 |
| CN | 102823064 | A | 12/2012 |
| CN | 103038944 | A | 4/2013 |
| CN | 103155284 | A | 6/2013 |
| CN | 104425105 | A | 3/2015 |
| CN | 105122549 | A | 12/2015 |
| CN | 105191020 | A | 12/2015 |
| CN | 105261911 | A | 1/2016 |
| CN | 106033928 | A | 10/2016 |
| DE | 102011118293 | A1 | 5/2013 |
| DE | 102012103162 | A1 | 10/2013 |
| DE | 102013225565 | A1 | 6/2015 |
| JP | S58-005286 | U | 1/1983 |
| JP | S58-023106 | A | 2/1983 |
| JP | S63-080827 | U | 5/1988 |
| JP | S 63-146969 | U | 9/1988 |
| JP | H03 289105 | A | 3/1990 |
| JP | 2002-198155 | A | 7/2002 |
| JP | 2003-145274 | A | 5/2003 |
| JP | 2003234218 | A | 8/2003 |
| JP | 2004-214371 | A | 7/2004 |
| JP | 2007-128657 | A | 5/2007 |
| JP | 2007273757 | A | 10/2007 |
| JP | 3140817 | U | 4/2008 |
| JP | 2009070769 | A | 4/2009 |
| JP | 3174350 | U | 3/2012 |
| JP | 2012-134111 | A | 7/2012 |
| JP | 2013-020761 | * | 1/2013 |
| JP | 2013-187171 | A | 9/2013 |
| JP | 2016-091799 | A | 5/2016 |
| JP | 6172468 | B1 | 8/2017 |
| WO | WO 2015/014647 | A | 2/2015 |

* cited by examiner

ELECTRICAL DEVICE WITH TERMINAL REGION AND METHOD FOR PRODUCING A TERMINAL REGION

CROSS-REFERENCE TO RELATED APPLICATIONS

This application is a U.S. National Stage of International Application No. PCT/EP2018/075485, filed Sep. 20, 2018, which claims the benefit of Germany Patent Application No. 102017121924.2, filed Sep. 21, 2017, both of which are incorporated herein by reference in their entireties.

The present invention relates to a terminal region for an electrical device. The device is for example an inductive device. The terminal region is configured for electrical connection of a stranded wire of the device, in particular a high-frequency stranded wire, with a printed circuit board. The stranded wire for example forms a winding, in particular a coil of the device.

In known methods for processing a stranded wire to produce a terminal region, stranded wire insulation is removed by immersion in a hot solder bath. This process is difficult to control and often leads to shortcomings in quality. In addition, cavities often remain in the terminal region formed, such that the terminal region is not compact in shape.

In other known methods a prefabricated cable lug or annular cable lug is used to terminate a stranded wire. However, such preshaped sleeves increase the thickness of the terminal region and are not very flexible.

It is an object of the present invention to provide an improved terminal region for an electrical device having a stranded wire.

According to a first aspect of the present invention, an electrical device with a terminal region is provided. The terminal region is suitable for connection with a printed circuit board. In particular, the terminal region is configured for direct connection with contacts of the printed circuit board, for example for attachment by soldering. Thus, no further element is required for connection with the printed circuit board in addition to the terminal region. The terminal region may be configured in the form of a terminal pin.

The terminal region has a stranded wire. The stranded wire has a multiplicity of individual wires. The stranded wire for example forms a winding of the device, in particular a coil. The electrical device takes the form of an inductive device, for example. In particular, the terminal region has an end of the stranded wire which projects out of the winding.

The device may have a support. A winding of the stranded wire, for example, is arranged on the support.

In addition, the terminal region has an enclosure piece, which surrounds the stranded wire. The enclosure piece may completely surround the stranded wire in the terminal region. The enclosure piece may have marginal zones which overlap. As a result of the overlap, the enclosure piece may be formed particularly tightly against the individual wires. In addition, the overlap enables flexible shaping of the enclosure piece during production of the terminal region.

The enclosure piece in particular is a “splice crimp”, i.e. a metallic band piece, which is bent around the stranded wire. To produce the terminal region, a flat, unshaped band piece is provided, for example, and bent around the stranded wire. The enclosure piece is thus given its shape, in particular a sleeve shape, only on arrangement around the stranded wire. Such an enclosure piece may differ from a prefabricated sleeve, such as for example a cable lug, in the overlap of marginal zones.

The enclosure piece is, for example, directly electrically connected with the stranded wire, such that no further electrical connection material, in particular no solder material or conductive adhesive, is needed. The terminal region is in particular produced soldering-free, i.e. without soldering. The side effects which arise during soldering, such as for example damage to the adjacent winding due to the evolution of heat or troublesome balls of solder, are thus absent.

For example, the enclosure piece is connected with the individual wires of the stranded wire by thermal diffusion bonding. In thermal diffusion bonding the individual wires and the enclosure piece are connected together through exposure to pressure and elevated temperature. In this case, the temperature is lower than the melting temperature of the material of the enclosure piece and the material of the individual wires. In diffusion bonding, bilateral diffusion takes place at an atomic level over the boundary surfaces of the parts to be connected together, resulting in an intimate connection of the parts. In the terminal region it is possible both for the enclosure piece to be connected to the individual wires by diffusion bonding, and the individual wires to one another.

Connection by thermal diffusion bonding is apparent from the finished device through the intimate connection of the enclosure piece with the individual wires and of the individual wires with one another. The exposure to pressure during thermal diffusion bonding produces compaction of the terminal region, such that the terminal region has no or only small cavities. Due to compaction during the production process, the terminal region may have a smaller thickness than the stranded wire provided with insulation.

The terminal region may exhibit residues of external insulation of the stranded wire and of insulation of the individual wires, for example in the form of clumped particles. During thermal diffusion bonding, for example, the insulation of the individual wires and/or the external insulation of the stranded wire is melted. This enables the stranded wire to be connected to the enclosure piece without previous, separate removal of the insulation.

The stranded wire may terminate flush with the enclosure piece. In particular, the stranded wire extends through the entire terminal region. Electrical connection of the device thus occurs almost directly at the stranded wire, in the case of connection to the side of the terminal region separated only by the band piece. This results in advantages in electrical and mechanical terms, for example particularly good DC resistance and high mechanical stability.

In one embodiment, the terminal region is configured for pin through hole (PTH) mounting. The length and cross-sectional shape of the terminal region are in this case in particular suitably selected.

In one embodiment the terminal region is configured for SMD mounting, i.e. for surface mounting. The terminal region 2 may to this end also have a kink or bend 32, as shown in FIG. 6. The terminal region 2 may have a flat bottom 33, which is suitable for placing on and connection to a printed circuit board 30 as shown in FIG. 6.

The external shape of the terminal region may be formed in thermal diffusion bonding by a suitable tool, in particular a compaction tool. For example, a tool has contact surfaces which rest against the enclosure piece and define the external shape of the terminal region through the exertion of pressure. A bend or kink in the terminal region may also be created in the process.

In one embodiment, the terminal region is rectangular in shape. The terminal region may also be square in shape. In one embodiment, the terminal region is round in shape. The terminal region may also have a round shape merely in sections.

The terminal region is for example oriented downwards. The terminal region may in particular be oriented in such a way that, when the device is mounted on a printed circuit board, said terminal region is insertable directly into holes in the printed circuit board or may be arranged on the printed circuit board.

The device may have a plurality of terminal regions. For example, the device has a plurality of terminal regions arranged adjacent one another. The device may also have terminal regions on opposing sides. The device may have a plurality of stranded wires, the ends of which are each connected with terminal regions.

In one embodiment, the terminal region is fixed in a holder. The holder is, for example, arranged on a support of the device. In particular, the holder may take the form of a clamping device. The terminal region is, for example, fixed directly in the holder or a region of the stranded wire adjacent the terminal region is fixed in the holder.

In one embodiment, the terminal region is not directly fixed. In particular, the terminal region or regions adjacent thereto of the stranded wire are not fixed in a holder. Thus, the terminal region has a degree of spatial flexibility, such that it may be flexibly mounted.

According to a further aspect of the present invention, an arrangement having the above-described device and a printed circuit board is provided. The terminal region is connected with the printed circuit board, for example by pin through hole, surface, screw, or clamp mounting.

According to a further aspect of the present invention, a method is provided for producing a terminal region of an electrical device. The terminal region and the device may in particular be those described above.

In this case, a device having a stranded wire with a multiplicity of individual wires is provided. The individual wires each for example exhibit insulation in the form of a enameling. In addition, the stranded wire may have external insulation, for example in the form of a sleeve. It is also possible for no external insulation to be present.

A band piece is provided, in particular in the form of a "splice crimp". The band piece is bent around the stranded wire. An enclosure piece, which envelops the stranded wire in regions, is thus shaped from the band piece. Marginal zones of the enclosure piece may overlap.

The enclosure piece is then connected to the stranded wire by thermal diffusion bonding. Mechanical pressure is in this case exerted on the arrangement of stranded wire and enclosure piece. In particular, the enclosure piece is pressed against the stranded wire. At the same time, the arrangement is heated.

Heating proceeds for example by current flow. To this end, electrodes may be applied to the enclosure piece. In particular, heating arises due to the electrical resistance of the insulation. Heating leads to melting of the insulation of the stranded wire. The resultant cavities are largely closed by the continuous exertion of mechanical pressure. A particularly compact shape is thus obtained for the terminal region.

In the case of thermal diffusion bonding, the external geometry of the terminal region may also be configured depending on the desired form of mounting. The contact surfaces of the pressure-exerting tools are here selected accordingly.

After thermal diffusion bonding the free end of the stranded wire may be detached. In particular, flush termination of the stranded wire with the enclosure piece may be achieved.

The present disclosure describes multiple aspects of an invention. All the characteristics which have been disclosed in relation to the device, the arrangement or the method, are accordingly also disclosed in relation to the other aspects, even if the respective characteristic is not mentioned explicitly in the context of the other aspects.

Furthermore, the description of the subjects indicated here is not restricted to the individual specific embodiments. Instead, the features of the individual embodiments may, insofar as technically meaningful, be combined with one another.

The subjects described here are explained in greater detail below with reference to schematic exemplary embodiments.

In the figures.

In the following figures identical reference signs preferably relate to functionally or structurally corresponding parts of the various embodiments.

Figure 1A:
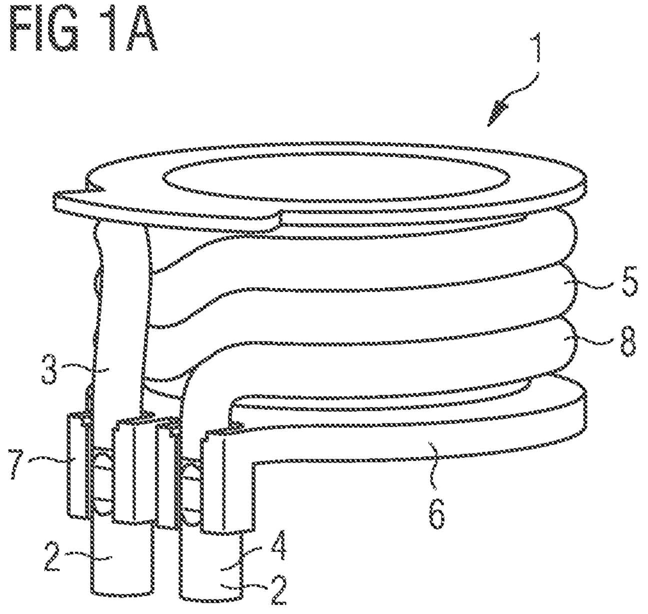
FIG. 1A is a perspective view of one embodiment of a device.

FIG. 1A shows a device 1 having a terminal region 2 for connecting the device 1 to a printed circuit board. The device 1 for example is an inductive device.

The terminal region 2 is configured in particular in the form of a terminal pin. The terminal region 2 is insertable for example into holes of a printed circuit board. In particular, the terminal region 2 is suitable for pin through hole mounting. The terminal region 2 points downwards.

In the present case, the terminal region 2 has a rectangular cross-sectional shape. Depending on the desired terminal design, the terminal region 2 may also have another shape. The component 1 may have a plurality of terminal regions 2. In the present case, two terminal regions 2 are provided, which are arranged adjacent one another.

The terminal region 2 has a stranded wire 3 and an enclosure piece 4 arranged therearound. The stranded wire 3 extends into the enclosure piece 4. In particular, the ends of the stranded wire 3 and of the enclosure piece 4 terminate flush with one another. Thus, in the case of PTH mounting the stranded wire 3 extends directly into the printed circuit board. In this way, local heat peaks at the printed circuit board can be avoided. In addition, an improvement in electrical behavior can be achieved thereby, for example in the case of resistance.

The stranded wire 3 may for example be configured as a high-frequency stranded wire. The stranded wire 3 has a multiplicity of individual wires, for example 100 to 5000 individual wires. The stranded wire 3 has a round cross-sectional shape for example outside the terminal region 2.

The stranded wire 3 is surrounded by external insulation 8 outside the terminal region 2. The insulation 8 is configured in particular as an insulating sleeve, in which all the individual wires are accommodated. Each individual wire may additionally be surrounded outside the terminal region 2 by internal insulation, which takes the form, for example, of an enamel layer. The individual wires comprise copper, for example. The individual wires for example have thicknesses of between 0.02 and 0.5 mm.

The stranded wire 3 forms a winding 5, in particular a coil, of the device 1. The winding 5 is arranged on a support 6. The support 6 comprises an insulating material.

The enclosure piece 4 in particular is a so-called “splice crimp”. A “splice crimp” is a metallic band piece which is provided in a flat shape, for example, and then bent around a conductor. In this way, the enclosure piece 4 obtains its geometry, in particular its tubular or sleeve shape, only during arrangement around the stranded wire 3. The enclosure piece 4 for example comprises a metal. For example, the enclosure piece 4 comprises copper, brass, bronze or other copper alloys. The enclosure piece 4 may additionally be tinned. The enclosure piece 4 is made, for example, from a flat, metallic band.

The terminal regions 2 are mechanically fixed by means of a holder 7. For example, the terminal regions 2 are clamped in place in the holder 7. The holder 7 is arranged on the support 6. The holder 7 may be an integral part of the support 6.

The terminal regions 2 may be arranged very close to the winding 5, for example at a distance of a few mm, in particular at a distance of up to 10 mm.

The enclosure piece 4 is directly connected with the stranded wire 3. The connection is produced in particular by thermal diffusion bonding. To this end, the parts to be connected together, i.e. the enclosure piece 4 and the stranded wire 3, are pressed together and simultaneously heated. The temperature is here below the melting temperature of the parts to be connected. The outer contour of the terminal region 2, for example a rectangular shape, is produced in the process.

Figure 1B:
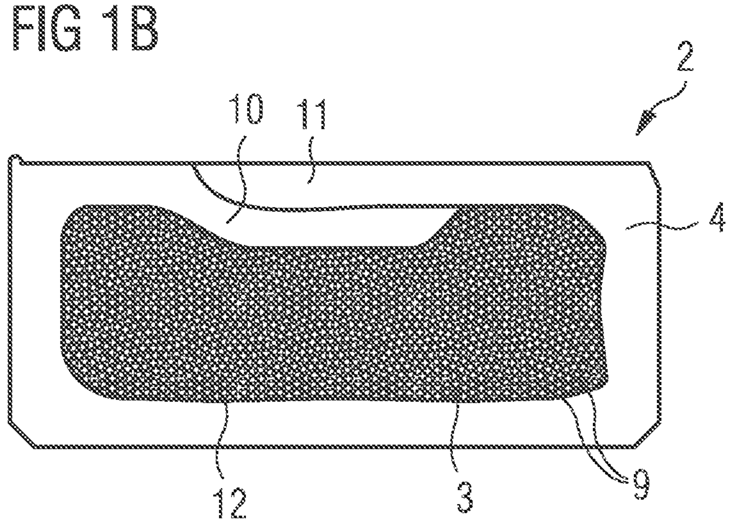
FIG. 1B is a sectional view of the terminal region of the device of FIG. 1A.

FIG. 1B is a sectional view of the terminal region 2 of the device 1 of FIG. 1A. The associated device 1 may also be differently configured from that in FIG. 1A.

The terminal region 2 has a rectangular outer contour. The individual wires 9 of the stranded wire 3 are identifiable. The enclosure piece 4 completely surrounds the stranded wire 3. The enclosure piece 4 has marginal zones 10, 11 which overlap. The enclosure piece 4 tightly encloses the stranded wire 3. The individual wires 9 lie closely against one another. It is apparent from the shape of the enclosure piece 4, in particular from the overlap of the marginal zones 10, 11 and the tight enclosure of the stranded wire 3 by the enclosure piece 4, that the enclosure piece 4 is not preshaped as a sleeve but acquires its sleeve shape only when it is wrapped around the stranded wire 3.

The enclosure piece 4 is firmly connected mechanically and electrically with the individual wires 9 of the stranded wire 3 by thermal diffusion bonding. The individual wires 9 are likewise firmly connected together mechanically and electrically by thermal diffusion bonding. Some residues of insulation of the individual wires 9 and/or of external insulation of the stranded wire 3 are apparent.

These residues make it apparent that the insulation is removed only during thermal diffusion bonding. Immediately prior to diffusion bonding the individual wires 9 are still surrounded by insulation 14. The insulation 14 melts during diffusion bonding, such that an electrical connection of the individual wires 9 may be produced. The stranded wire 3 may also still have the external insulation 8 immediately prior to the diffusion bonding. This insulation 8 also melts during diffusion bonding, so enabling electrical connection of the stranded wire 3 with the enclosure piece 4.

Figure 2A:
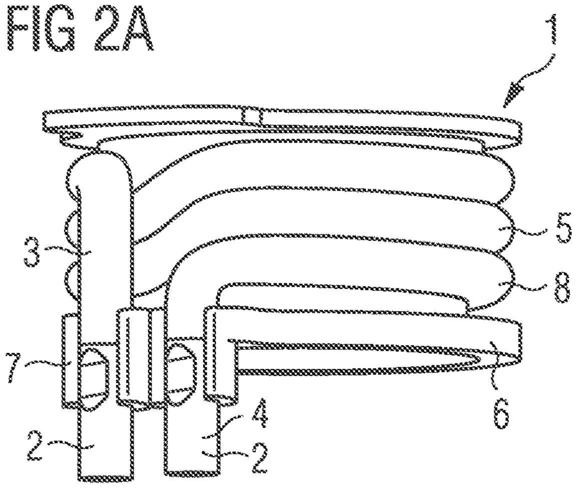
FIG. 2A is a perspective view of a further embodiment of a device.

FIG. 2A shows a further embodiment of a device 1 comprising a terminal region 2. Unlike the device 1 of FIG. 1A, the terminal region 2 has an approximately round cross-sectional shape.

Figure 2B:
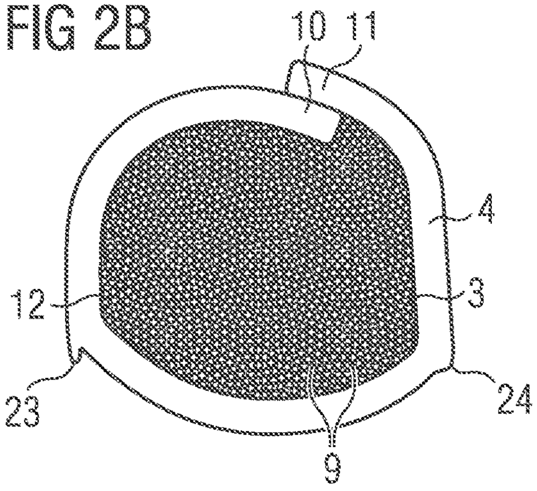
FIG. 2B is a sectional view of the terminal region of the device of FIG. 2A.

FIG. 2B is a sectional view of the terminal region 2 of the device 1 of FIG. 2A. Here too, the overlap of the marginal zones 10, 11 is apparent.

The process of shaping the enclosure piece 4 and the entire terminal region 2 by exerting external pressure is apparent from the incompletely round external geometry. It is apparent in particular from edges 23, 24 visible at the bottom that the shape of the terminal region 2 is formed by compaction between a lower die and one or more upper dies. The edges 23, 24 reveal the boundaries between lower and upper dies.

Figure 3:
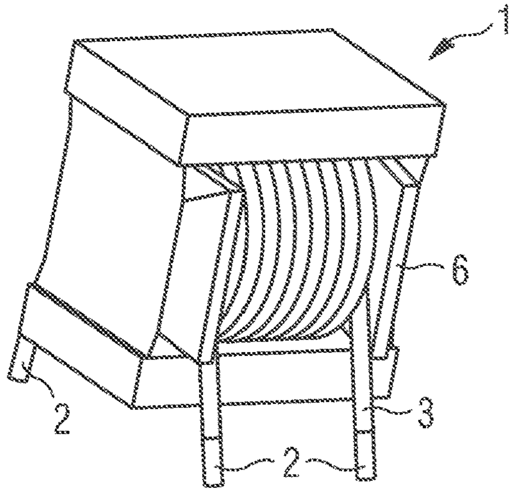
FIG. 3 is a perspective view of a further embodiment of a device.

FIG. 3 is a perspective view of a further embodiment of a device 1. Unlike the devices 1 of FIGS. 1A and 2A, here the terminal regions 2 are not fixed by a holder 7. The position of the terminal regions 2 is defined merely by the positioning of the stranded wire 3 on a support 6. In particular, the stranded wire 3 rests laterally against the support 6. The lack of direct fixation of the terminal region 2 increases mounting flexibility of the device 1.

Figure 5:
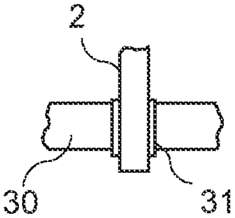
FIG. 5 illustrates a schematic view of a terminal region inserted in a printed circuit board with solder applied to the terminal regions.
Figure 6:
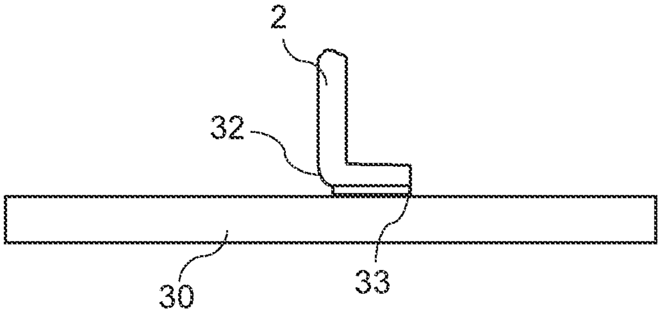
FIG. 6 illustrates a schematic view of a terminal region with a bend.

The device 1 has four terminal regions 2, which project downwards from the support 6. The terminal regions 2 may be inserted into a printed circuit board 30 for PTH mounting, as shown in FIG. 5. Attachment by soldering, for example wave soldering, may be performed. The solder material 31 is applied directly to the terminal regions 2 as shown in FIG. 5.

Alternatively, the device 1 may also be mounted using surface mounting. To this end, the device 1 is arranged on a printed circuit board and the terminal regions 2 are attached by soldering to the printed circuit board. For this purpose, the terminal regions 2 may also be bent outwards or inwards. Bending may for example be produced prior to or during thermal diffusion bonding by a suitable forming tool.

Alternatively, electrical connection is also possible using a screw or clamp connection of the terminal region 2.

The terminal regions 2 may also serve as supporting legs on arrangement of the device 1 on a printed circuit board or another support.

FIGS. 4A to 4G show method steps for production of a terminal region 2. The method is suitable for example for producing the terminal regions 2 shown in FIGS. 1A to 3.

Figure 4A:
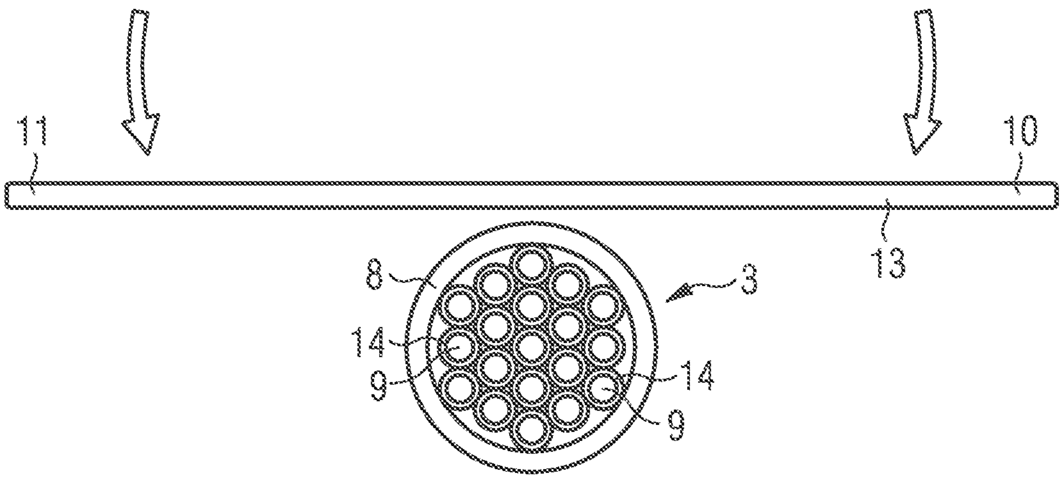
FIGS. 4A to 4G show method steps for production of a terminal region of a device.

FIG. 4A shows a first method step, in which a band piece 13 is provided and bent around a stranded wire 3, such that an enclosure piece 4 is formed from the band piece 13. The stranded wire 3 is surrounded by external insulation 8 and has a multiplicity of individual wires 9 which are each surrounded by insulation 14.

The band piece 13 is for example cut from a metallic band. The band piece 13 is uniform in shape and thus does not have differently shaped regions. A particularly space-saving terminal region 2 may be formed using such a band piece 13. As material, the band piece 13 for example comprises copper, brass, bronze or an alloy of such materials. The band piece 13 is formed from a uniform material and does not have any regions of different materials.

The band piece 13 is bent around the stranded wire 3. To this end, for example, the arrangement is inserted into a crimping device and the band piece 13 is introduced and bent around the stranded wire 3 through the exertion of force (see arrows). In the process, marginal zones 10, 11 of the band piece 13 are laid on top of one another.

Such a band piece 13 or the enclosure piece 4 formed therefrom is conventionally known as a "splice crimp". The enclosure piece 4 differs from a prefabricated sleeve, into which one or more conductors are inserted. The present enclosure piece 4 acquires its sleeve shape only during arrangement thereof around the stranded wire 3. The stranded wire 3 is thus not inserted into the enclosure piece 4.

Figure 4B:
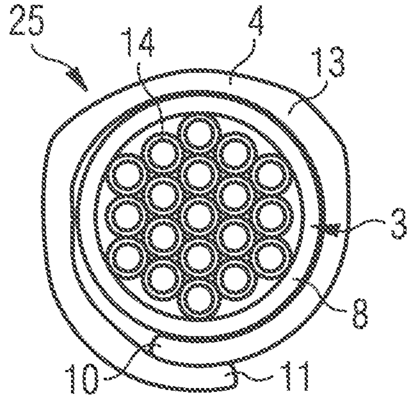

FIG. 4B is a sectional view of the arrangement 25 of enclosure piece 4 and stranded wire 3 after formation of the enclosure piece 4 around the stranded wire 3. The insulation 8, 14 is still present, meaning that there is no electrical connection between enclosure piece 4 and stranded wire 3.

Figure 4C:

FIG. 4C is a side view of the arrangement 25 according to FIG. 4B. The arrangement 25 of enclosure piece 4 and stranded wire 3 has a somewhat greater thickness d than adjacent regions of the stranded wire 3, since no compaction has as yet taken place. A free end 15 of the stranded wire 3 projects out of the enclosure piece 4.

Figure 4D:
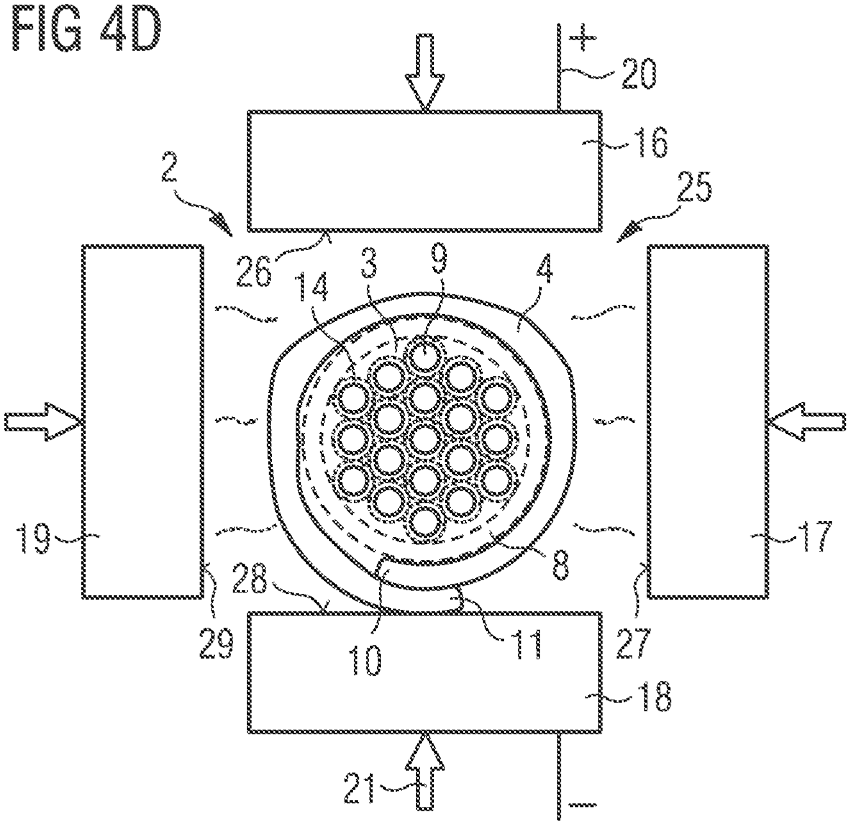

FIG. 4D shows the method step of thermal diffusion bonding and simultaneous compacting of the terminal region 2.

Force (see arrows) is exerted from at least one side onto the arrangement 25 of stranded wire 3 and enclosure piece 4. To this end, for example, a compaction tool with a plurality of stamps 16, 17, 18, 19 is used. For example, the arrangement of stranded wire 3 and enclosure piece 4 rests on the lower stamp 19. The arrangement 25 may for example also be held between two stamps 17, 19.

The contact surfaces 26, 27, 28, 29 of the stamps 16, 17, 18, 19 against the enclosure piece 4 determine the outer contour of the terminal region 2. The stamps 16, 17, 18, 19 may each have flat contact surfaces 26, 27, 28, 29, such that the terminal region 2 has flat side faces. The stamps 16, 17, 18, 19 may also have rounded contact surfaces 26, 27, 28, 29, such that the terminal region 2 has correspondingly rounded outer contours. The stamps 16, 17, 18, 19 may also have a combination of flat and rounded contact surfaces 26, 27, 28, 29. The stamps 16, 17, 18, 19 may for example exert pressure simultaneously or one after the other.

During compression the arrangement 25 of stranded wire 3 and enclosure piece 4 is heated. In the process, electrodes 20, 21 are for example applied against opposing sides of the enclosure piece 4. The electrodes 20, 21 may be integrated into the compaction tool. Due to the ohmic resistance of the insulation 8, 14, the stranded wire 3 heats up ("resistance welding"), such that the insulation 8, 14 melts, as indicated here by dashed boundaries. In the process, the insulation 8, 14 evaporates at least in part. The insulation 8, 14 is largely removed from the individual wires 9. All that may remain is locally molten residues of the insulation 8, 14.

The continuous application of pressure results in closure of any cavities which arise inter alia through melting of the insulation 8, 14, and the terminal region 2 adopts a compact shape. Compaction is enabled inter alia by a growing overlap between the marginal zones 10, 11. Under the applied pressure and the elevated temperature the exposed individual wires 9 are permanently electrically and mechanically connected together and with the enclosure piece 4 by thermal diffusion bonding. The method may also be denoted as hot crimping or diffusion welding.

Figure 4E:
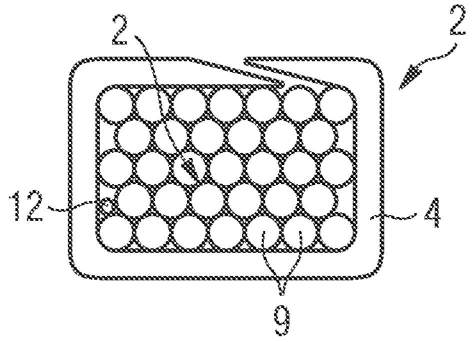

FIG. 4E shows the terminal region 2 after the connection and compaction process. The terminal region 2 now has a rectangular outer contour. The terminal region 2 is suitable for example for PTH mounting. Insulation residues 12 are apparent in the form of clumped particles. The individual wires 9 are connected firmly together and with the enclosure piece 4. Depending on the selected process parameters and geometries, after the connection and compaction process the individual wires 9 may no longer be identifiable as such with the naked eye. The terminal region 2 may thereby have the appearance of a uniform element.

The terminal region 2 is filled within the enclosure piece 4 completely or almost completely with the material of the individual wires 9.

Figure 4F:
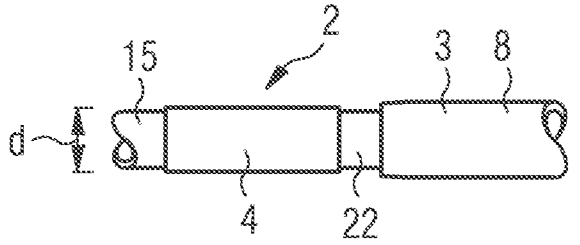

FIG. 4F is a side view of the terminal region 2 from FIG. 4E. Due to the compaction, the terminal region 2 has a smaller thickness d than the region of the stranded wire 3 which is still provided with external insulation 8 outside the terminal region 2. A region 22 may be present adjacent the terminal region 2 and the enclosure piece 4 in which the stranded wire 3 does not have any external insulation 14. This region may however be kept small by the readily controllable heating process. This also enables the formation of a terminal region 2 in the immediate vicinity of a winding of the device.

In a further method step the projecting region of the free end 15 of the stranded wire 3 may be detached, such that the enclosure piece 4 terminates flush with the stranded wire 3. An end region of the enclosure piece 4 may also be detached at the same time.

Figure 4G:
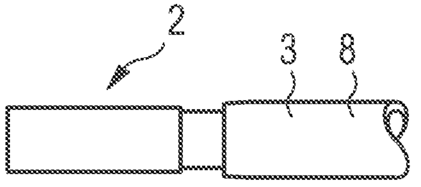

FIG. 4G shows the terminal region 2 after detachment of the projecting region of the stranded wire 3. The terminal region 2 may now be fixed in a holder or be used without further fixation for connection to a printed circuit board.

The described method enables good electrical conductivity to be achieved with a high mechanical connection strength. In addition, the method enables simple, readily controllable production of an electrical terminal for the device 1, such that the connection can be produced at low cost and within a short time.

LIST OF REFERENCE SIGNS

1 Device
2 Terminal region
3 Stranded wire
4 Enclosure piece
5 Winding
6 Support
7 Holder
8 Insulation
9 Individual wire
10 Marginal zone
11 Marginal zone
12 Insulation residue
13 Band piece
14 Insulation
15 Free end
16 Stamp
17 Stamp
18 Stamp
19 Stamp
20 Electrode
21 Electrode
22 Region
23 Edge
24 Edge
25 Arrangement
26 Contact surface
27 Contact surface

28 Contact surface
29 Contact surface
d Thickness

The invention claimed is:

1. An assembly of an electrical device and a printed circuit board, the electrical device comprising a terminal region for connection with the printed circuit board, the printed circuit board comprising contacts for electrical connection, wherein the terminal region consists of a single stranded wire and an enclosure piece, the enclosure piece surrounding the single stranded wire, wherein the single stranded wire includes a plurality of individual wires, and the individual wires have individual insulations, wherein the single stranded wire has an outer insulation enclosing all the individual wires, and wherein the individual insulations are present in regions outside the terminal region and are at least partially removed in the terminal region, wherein the outer insulation is present in regions outside the terminal region and is at least partially removed in the terminal region, in which the enclosure piece consists of a metallic band piece, in which the enclosure piece has marginal zones that overlap, wherein the single stranded wire is connected with the enclosure piece by thermal diffusion bonding, wherein the overlapping marginal zones are connected to each other only through thermal diffusion bonding, wherein the electrical device is mounted on the printed circuit board, wherein the terminal region is directly connected with the contacts of the printed circuit board by soldering, and wherein the single stranded wire terminates flush with the enclosure piece or protrudes out of the enclosure piece at both ends;

wherein the electrical device includes a second terminal region, the second terminal region comprising a second end of the single stranded wire and a second enclosure piece, the second enclosure piece surrounding the second end of the single stranded wire, the single stranded wire forms a winding for the device in which a first end of the single stranded wire is at the terminal region and the second end of the single stranded wire is at the second terminal region, the winding being formed by a portion of the single stranded wire between the first end and the second end;

wherein after the single stranded wire is connected to the enclosure piece and the winding is formed around a winding support, the electrical device is mounted on the printed circuit board;

wherein the winding support includes two integral holder elements for holding the single stranded wire adjacent to or at the terminal region and the second terminal region;

wherein each of the two integral holder elements clamps around a portion of a circumference of the single stranded wire.

2. The assembly of claim 1, in which the single stranded wire extends through the entire terminal region.

3. The assembly of claim 1, in which the electrical device is mounted on the printed circuit board by pin through hole mounting.

4. The assembly of claim 3, wherein the terminal region is inserted into the printed circuit board and solder is directly applied on the terminal region.

5. The assembly of claim 1, in which the electrical device is mounted on the printed circuit board by surface mounting.

6. The assembly of claim 5, wherein the terminal region includes a kink or bend and comprises a flat bottom side positioned on and connected to the printed circuit board.

7. The assembly of claim 1, in which the terminal region is rectangular in shape, having flat side surfaces.

8. The assembly of claim 1, in which the terminal region is oriented downwards.

9. The assembly of claim 1, wherein the insulations of the individual wires are lacquer layers.

10. The assembly of claim 1, wherein the individual insulations and the outer insulation are present in the winding and located outside the terminal region and outside the second terminal region.

11. The assembly of claim 1, wherein the winding support is an insulated material.

12. The assembly of claim 1, wherein the terminal region and the second terminal region are arranged at a distance that is close to the winding, the distance being less than 10 mm.

13. An assembly of an electrical device and a printed circuit board, the electrical device comprising a terminal region for connection with the printed circuit board, the printed circuit board comprising contacts for electrical connection, wherein the terminal region consists of a single stranded wire and an enclosure piece, the enclosure piece surrounding the single stranded wire, wherein the single stranded wire includes a plurality of individual wires, and the individual wires have individual insulations, wherein the single stranded wire has an outer insulation enclosing all the individual wires, and wherein the individual insulations are present in regions outside the terminal region and are at least partially removed in the terminal region, wherein the outer insulation is present in regions outside the terminal region and is at least partially removed in the terminal region, in which the enclosure piece consists of a metallic band piece, in which the enclosure piece has marginal zones that overlap, wherein the single stranded wire is connected with the enclosure piece by thermal diffusion bonding, wherein the overlapping marginal zones are connected to each other only through thermal diffusion bonding, wherein the electrical device is mounted on the printed circuit board, wherein the terminal region is directly connected with the contacts of the printed circuit board by soldering, and wherein the single stranded wire terminates flush with the enclosure piece or protrudes out of the enclosure piece at both ends;

wherein the electrical device includes a second terminal region, the second terminal region comprising a second end of the single stranded wire and a second enclosure piece, the second enclosure piece surrounding the second end of the single stranded wire, the single stranded wire forms a winding for the device in which a first end of the single stranded wire is at the terminal region and the second end of the single stranded wire is at the second terminal region, the winding being formed by a portion of the single stranded wire between the first end and the second end;

wherein the terminal region and the second terminal region are arranged at a distance that is close to the winding, the distance being less than 10 mm.

* * * * *